Figure 1:
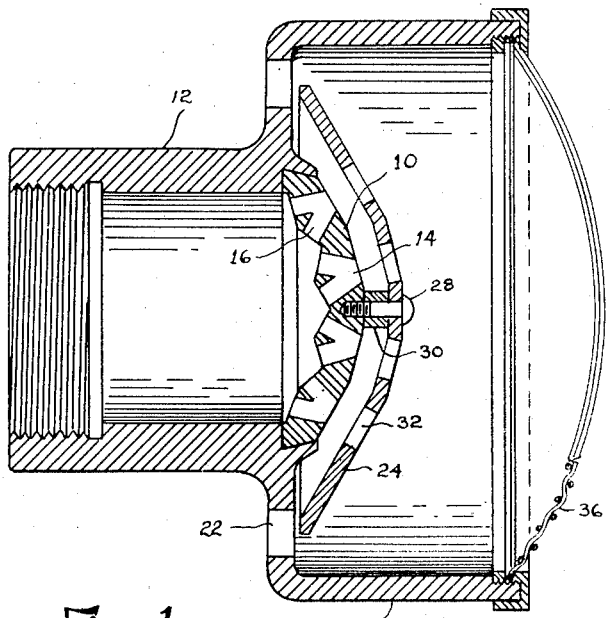

Dec. 20, 1949   H. G. FREEMAN ET AL   2,492,037
APPARATUS FOR GENERATING FOAM
Filed May 8, 1945   2 Sheets-Sheet 2

INVENTORS
Howard G. Freeman
Frank Hencinski
BY Churchill & Jenney
Attorneys

Patented Dec. 20, 1949

2,492,037

UNITED STATES PATENT OFFICE 2,492,037

APPARATUS FOR GENERATING FOAM

Howard G. Freeman and Frank Hencinski, Worcester, Mass., assignors to Rockwood Sprinkler Company, Worcester, Mass., a corporation of Massachusetts Application May 8, 1945, Serial No. 592,658

5 Claims. (Cl. 261—116)

The present invention relates to foam production, and more particularly to an apparatus for generating a smothering foam by which fires in highly flammable fluids may effectively be extinguished.

The advantages of a mass of foam in fighting fires involving gasoline and other inflammable liquids are well recognized. Suitable foaming agents are available which, when added to water, provide a solution that may be aerated to form a mass of bubbles. When this mass of bubbles or foam is discharged onto the surface of a burning liquid, a smothering and cooling blanket is created that is highly effective in extinguishing the flames and in preventing spontaneous re-ignition of the unburned liquid.

The types of nozzles hitherto employed for foam generation and discharge have been of limited capacity and have lacked the proper discharge pattern for effective utilization of foam. Fires involving objects of three-dimensional shape such as airplanes and other large equipment that may as the result of an accident become bathed in burning fluid, require the application of a blanket of foam over an extensive surface in the shortest possible time. This can only be done by a nozzle that discharges the foam over a wide angle, and at rates measured in hundreds of gallons of liquid per minute.

Likewise of major importance, if serious fires such as those arising out of airplane crashes are to be effectively fought and the saving of life attempted, is the protection of fire-fighting personnel from the heat of the blaze. Successful application of foam requires that the operator be able to approach the blaze in spite of intense heat from burning gasolene or other fuel. Conventional foam-handling equipment has been severely handicapped in this respect, since the concentrated discharge pattern of the usual foam nozzle fails to provide any appreciable heat shield.

A further requirement is that the foam be of such quality as to provide a smothering blanket that clings to objects having irregular shapes and sloping surfaces. For this a foam of high quality is essential, characterized by fine bubble size and small free water content.

The methods and devices which have been employed for foam production generally rely on the aspirating action of one or more high velocity streams of liquid to effect the requisite mixing of air and liquid for bubble formation. In certain devices the aspirating action may also be relied on to introduce the foaming agent, in either liquid or solid form, into the stream of water. It appears, however, that the aspirating effect of liquid jets, even though the liquid supply be divided into a number of small jets, is inadequate to provide the degree of aeration necessary for proper bubble formation and generation of a foam of the desired properties. Nor has it been possible to provide a wide angle of discharge, since recombination of the jets into a single stream has been required to afford added turbulence.

We have discovered that a very substantial improvement may be effected if, instead of relying on liquid jets, the stream of water and foam forming agent is transformed into a mist or fog of very fine droplets. Fog-producing nozzles of the type commonly employed for firefighting purposes and particularly nozzles of the so-called internal impingement type disclosed in U. S. Patent No. 2,302,021 to Howard G. Freeman, one of the present inventors, exhibit very high aspirating properties. We have found it possible to utilize with great effectiveness this aspirating action of the fog-generating nozzle so as to cause large quantities of air to be drawn into and carried along by the fog or spray droplets of foam-forming solution and water. This mixture of air and fine droplets, which may be projected at a relatively wide angle, is then mechanically agitated, preferably by causing the mixture to impinge at high velocity onto and to be projected through a screen or grid which serves to complete the entrainment of air within the droplets to form a great volume of bubbles of small and relatively uniform size. Due to the character and pattern of the foam discharge, an effective blanket of foam may be rapidly laid over a wide area while the operator is protected from the heat of the blaze by the curtain of discharging foam.

One of the objects of the present invention is therefore to provide a foam generating apparatus which permits the generation and discharge of foam of great smothering power at wide angles of coverage and at very high rates of production.

It is likewise an object of the invention to provide a nozzle for the generation and discharge of foam which affords, during operation, substantial protection to the operator from the heat of the flames by reason of the shielding effect of the wide-angle foam discharge.

A further object of the invention consists in the provision of a foam generating nozzle of simple and compact construction and arrangement, adapted to operate in conjunction with conventional pumping equipment to receive the mixture of quenching liquid and foam forming agent through a single supply hose, and likewise adapted without modification to operate effectively on water alone to generate a smothering fog or mist for fighting fires where foam is unnecessary or unsuitable or where a supply of foam forming agent is lacking.

Figure 2:
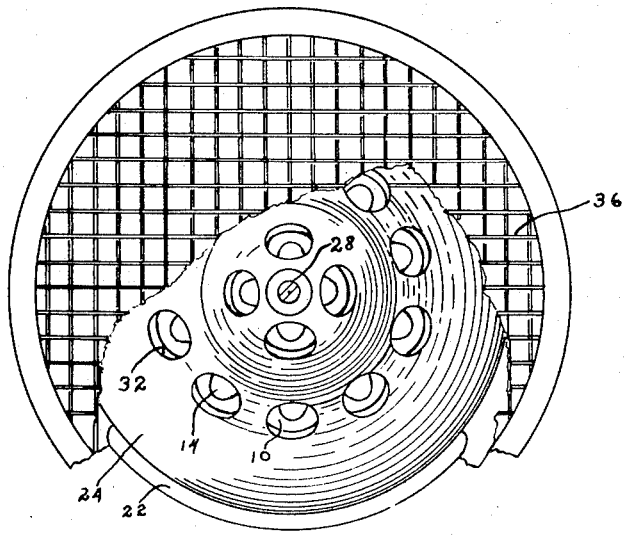
Figure 3:
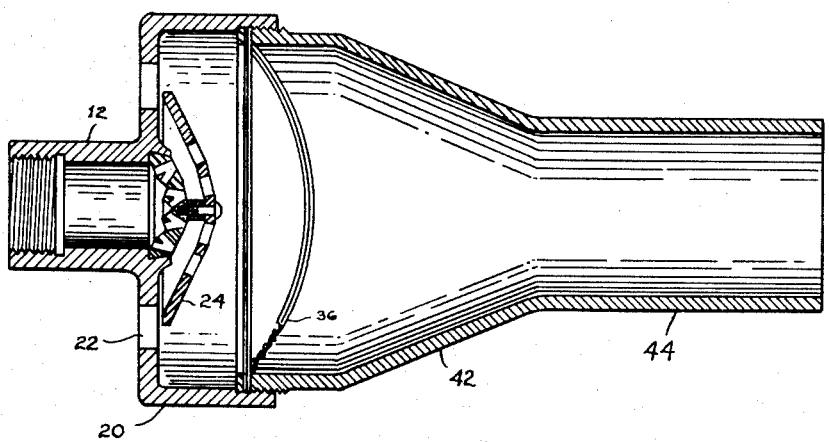
Figure 4:
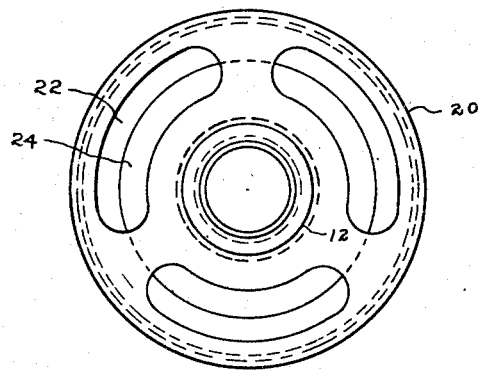
Figure 5:
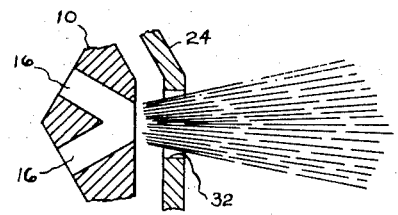

The several features of the invention are shown in and will be described in conjunction with the accompanying drawings, in which Fig. 1 is a view in longitudinal sectional elevation of a foam-generating nozzle embodying the invention; Fig. 2 is a front view thereof, partly broken away; Fig. 3 is a view taken similarly to Fig. 1, of a nozzle modified to provide a somewhat different type of discharge pattern; Fig. 4 is a view of the nozzle looking toward the inlet end thereof; and Fig. 5 is a detail sectional view of a portion of the fog-producing nozzle and aspirator plate.

In the illustrative embodiments the nozzle head 10 by which the fog or mist is generated is mounted within the nozzle body at the end of the inlet section 12. The inlet is threaded to permit attachment to a supply hose by which the previously-mixed solution of foam-forming agent and water is supplied under pressure.

The nozzle head is provided with a number of fog-generating orifices 14 through which the solution is discharged and at the same time converted into a mist or fog of fine droplets. To enhance the effectiveness of the foam-forming process, these orifices are preferably of the internal impingement type, in accordance with the disclosure of Freeman Patent No. 2,302,021 above referred to. The nozzle orifices are composed of pairs of passages 16 inclined to the nozzle surface and having the centerlines of each pair of passages intersecting substantially in the nozzle surface. At liquid pressures greater than the order of 30 lbs./sq. in., a fan-shaped spray of very fine droplets or mist is discharged from each orifice. For most purposes, a relatively wide discharge pattern is desirable, in which case the nozzle head may have orifices arranged to provide diverging sprays so as to afford an over-all spray pattern encompassing a substantial area.

The multiple, high-velocity spray streams have, by reason of the large amount of effective area provided by the multitude of fine droplets, a very substantial aspirating effect, so as to cause an appreciable amount of air to be drawn into and swept along with the spray of mist. In general, for the greatest amount of foam without sacrifice in foam quality, the optimum ratio in volume of air to volume of liquid is somwhere between five to one and eight to one.

Introduction of air in substantially the optimum ratio may be effectively accomplished through the provision of a hood or shroud 20 through which the multiple fog spray is projected. This hood may be formed by an enlarged section of the nozzle body beyond the nozzle head, and of such dimensions as not to restrict the spray pattern provided by the orifice arrangement in the nozzle head.

To admit air to the hood, openings 22 are provided through which air is drawn by the "sweeping" or aspirating action of the multitude of fine droplets moving at high velocity toward the discharge end. This aspirating action is so effective that an appreciable lowering of pressure may be observed, during nozzle operation, in the immediate vicinity of the inlet ports, indicating that a very substantial volume of air is being drawn into and mixed with the spray of mist.

The effectiveness of this aspirating action may be enhanced by causing a portion of the entering air to be directed into close association with the several spray streams close to the spray orifices. This may be accomplished by suitable air-intercepting and distributing means such as is indicated at 24. This member, which is in the form of a plate or cap approximating in contour that of the nozzle head, is mounted in spaced relation to the head by means of supporting screw 28 and spacing bushing 30. Apertures 32 are disposed in the cap in accurate register with the nozzle orifices to permit passage of the individual spray discharges therethrough. Since the spray patterns are relatively sharply defined at distances close to the discharge orifices (see Fig. 5), no appreciable interference with the nozzle discharge occurs.

The air which is drawn through the apertures in the cap by the high velocity spray streams may be taken from the openings 22 at the rear of the hood 20. To accomplish this, the edge of the cap may extend partially across the openings so that a passage is provided between the margin of the cap and the inner edge of the openings to cause air to be diverted into the space between the cap and the nozzle head. A flow of air into the hood may also take place through the openings outside the edge of the cap, such flow being induced by the substantial aspirating properties of the mist spray within the hood in the region beyond the cap.

To complete the entrainment of air within the droplets of water and foam solution, the mixture of air and mist is caused to impinge on and be projected through a screen or grid 36. The screen preferably is of spherical contour, so as to afford an approximately uniform radial distance from the nozzle head. The screen should be of sufficient size to intercept substantially the entire spray pattern. Where the nozzle construction embodies the aspirating hood 20, the screen may be secured within the discharge end thereof. The spacing between screen and nozzle head must be adequate to allow thorough intermingling of air and droplets before the mixture reaches the screen, yet not so great that the velocity drops below that necessary for droplet rupture and film formation by the screen, on which action the generation of high quality foam at high volumetric rates depends. In general, a mesh of the order of 3 to 10 per inch will be found most suitable for the screen.

A nozzle embodying these features of construction and operation provides a broadly divergent discharge pattern which enables a substantial area to be blanketed with foam in a matter of seconds and which also affords substantial protection to the operator from the heat of the flames. Furthermore, nozzles may readily be provided that operate effectively at discharge rates of several hundred gallons of liquid per minute. At air-to-liquid ratios of between five to one and eight to one, the rate of foam production is consequently measured in thousands of gallons per minute. Such volumetric increase is particularly significant in the case of portable equipment, where the water capacity may be limited. In the case of a truck carrying one thousand gallons of water, for example, the use of this foam nozzle in conjunction with the addition of a relatively small quantity of foam-forming agent to the tank makes available without any modification of pumping equipment or hose connections a supply of as much as eight thousand gallons of foam.

The foam nozzle, although particularly adapted to provide a broad discharge pattern, may be readily modified to discharge the foam in a stream, where special circumstances require a concentrated discharge of greater carrying power. Such modification, illustrated in Fig. 3, involves a tubular extension which may be screwed or otherwise attached to the hood or shroud of the nozzle of the first described embodiment. The attachment embodies a reducing section 42 and a discharge section 44, the cross-sectional area of the latter being correlated with that of the nozzle hood to provide a suitable discharge velocity. Since the foam is produced in the same manner and by the same means as with the embodiment of Figs. 1 and 2, the foam quality and high rate of production are not altered, but only the nature of the discharge pattern.

We claim as our invention:

1. A nozzle for foam generation comprising a nozzle head having a plurality of orifices for discharging multiple divergent sprays of fine droplets of quenching liquid and foam-forming agent, a hood through which the spray is projected, passages in said hood for admitting air thereto as a result of the aspirating action of the spray stream, means disposed in closely spaced relation to the nozzle head and having apertures registering with the nozzle orifices to permit the discharge of the spray streams therethrough, said means extending into communication with the passages in the hood for diverting admitted air to and around the separate spray streams, and a screen spaced from the nozzle head in the path of the projected spray for subjecting the mixture of air and droplets to high turbulence.

2. A nozzle for generating a fire-fighting foam comprising a nozzle head having a plurality of nozzle passages arranged in intersecting relation to direct high velocity liquid streams of quenching liquid containing a foam forming agent into impingement with one another close to the nozzle head to break up the liquid streams into a projected spray of finely-divided droplets, a screen spaced from the nozzle head in the path of the projected spray, means connecting the nozzle head and the screen for supporting the screen relative to the nozzle head, and passages in said supporting means for admitting air to the region between the screen and zone of impingement of the liquid streams on one another.

3. A nozzle for generating a fire-fighting foam comprising a nozzle head having a plurality of nozzle passages arranged in pairs intersecting substantially at the nozzle surface to direct liquid streams of quenching liquid containing a foam-forming agent into impingement with one another within the nozzle head, thereby to project a spray of finely-divided droplets of quenching liquid and foam forming agent, a hood carried by the nozzle head and extending forwardly of the nozzle substantially outside the nozzle discharge pattern, a screen carried by the hood in spaced relation to the nozzle, and passages adjacent the rear of the hood for admitting air to the region between the nozzle head and the screen.

4. A nozzle for generating a fire-fighting foam comprising a nozzle head having a plurality of pairs of passages, the passages of each pair extending along converging lines to direct streams of quenching liquid containing a foam-forming agent into impingement with one another to break up the liquid streams into projected sprays of finely divided liquid droplets, the pairs of passages being disposed in the nozzle head on divergent axes of resultant droplet sprays to provide an over-all spray pattern of substantial divergence, a screen spaced from the nozzle head in the path of said divergent spray and substantially encompassing the cross-section of the spray pattern, and means connecting the screen and the nozzle head, said means having passages for admission of air to the spray discharge intermediate the nozzle head and the screen.

5. A nozzle for generating a fire-fighting foam comprising a nozzle head having a plurality of pairs of nozzle passages, the passages of each pair intersecting substantially at the nozzle surface to direct liquid streams of quenching liquid containing a foam forming agent into impingement with one another close to the nozzle head to break up the liquid streams into multiple projected sprays of finely-divided droplets, the pairs of nozzle passages being disposed in the nozzle head on divergent axes of resultant droplet sprays to produce a substantially divergent overall spray pattern, a hood projecting forwardly of the nozzle head substantially outside the divergent spray pattern, a screen within the hood in the path of the projected spray, and passages in the hood rearwardly of the screen for admitting air into the projected spray between the zone of impingement of the liquid streams and the screen.

HOWARD G. FREEMAN.
FRANK HENCINSKI.

REFERENCES CITED

The following references are of record in the file of this patent:

UNITED STATES PATENTS

| Number | Name | Date |
|---|---|---|
| 425,329 | Korting | Apr. 8, 1890 |
| 494,604 | Slocum | Apr. 4, 1893 |
| 1,120,129 | Cable | Dec. 8, 1914 |
| 1,594,621 | Starr | Aug. 3, 1926 |
| 1,916,912 | Armstrong | July 4, 1933 |
| 2,210,846 | Aghnides | Aug. 6, 1940 |
| 2,247,311 | Rockwood | June 24, 1941 |
| 2,375,833 | Urquhart | May 15, 1945 |

FOREIGN PATENTS

| Number | Country | Date |
|---|---|---|
| 7,005 | Great Britain | Mar. 23, 1913 |
| 468,687 | Great Britain | July 6, 1937 |
| 140,997 | Germany | Dec. 7, 1901 |